(12) United States Patent
Kirejczyk

(10) Patent No.: US 7,424,788 B2
(45) Date of Patent: Sep. 16, 2008

(54) UNIVERSAL CABLE WINDOW REGULATOR ASSEMBLY FOR VEHICLES

(75) Inventor: Juliusz Kirejczyk, Newmarket (CA)

(73) Assignee: Intier Automotive Closures Inc., Newmarket, Ontario (CA)

( * ) Notice: Subject to any disclaimer, the term of this patent is extended or adjusted under 35 U.S.C. 154(b) by 392 days.

(21) Appl. No.: 10/476,147

(22) PCT Filed: Apr. 26, 2002

(86) PCT No.: PCT/CA02/00597

§ 371 (c)(1),
(2), (4) Date: Apr. 12, 2004

(87) PCT Pub. No.: WO02/088502

PCT Pub. Date: Nov. 7, 2002

(65) Prior Publication Data

US 2004/0163320 A1    Aug. 26, 2004

(51) Int. Cl.
*E05F 11/48*     (2006.01)
(52) U.S. Cl. ..................................... 49/352
(58) Field of Classification Search ............ 49/348, 49/349, 352, 502
See application file for complete search history.

(56) References Cited

U.S. PATENT DOCUMENTS

| 4,109,417 | A |   | 8/1978  | Fogarollo |
|-----------|---|---|---------|-----------|
| 4,110,935 | A |   | 9/1978  | Sessa |
| 4,805,346 | A |   | 2/1989  | Gergoe |
| 5,174,066 | A |   | 12/1992 | Dupuy |
| 5,469,662 | A |   | 11/1995 | TenBrink et al. |
| 5,477,641 | A |   | 12/1995 | Heckel et al. |
| 5,694,717 | A | * | 12/1997 | Gier ............................ 49/352 |
| 6,354,652 | B1 | * | 3/2002 | Arquevaux et al. ........ 296/146.5 |
| 6,397,524 | B1 | * | 6/2002 | Sakaguchi et al. ............ 49/375 |
| 6,510,657 | B1 | * | 1/2003 | Bertolini et al. ............... 49/502 |
| 6,688,043 | B1 | * | 2/2004 | Feder et al. ................... 49/352 |
| 6,820,370 | B2 | * | 11/2004 | Marscholl ..................... 49/352 |
| 2002/0083647 | A1 | * | 7/2002 | Bostian et al. ................. 49/352 |

* cited by examiner

*Primary Examiner*—Jerry Redman
(74) *Attorney, Agent, or Firm*—Clark Hill PLC

(57) ABSTRACT

A cable window regulator is provided which includes a carrier panel securable to a door. First and second pulleys are rotatably mounted to the carrier panel. A lift plate is securable to a window and the window is constrained to travel along a predefined path. The lift plate is not directly attached to the carrier panel. A pair of cables is trained respectively around the first and second pulleys and is fixed to the lift plate. A drive assembly is operably coupled to the first and second cables for moving the pair of cables. The lift plate moves to and fro in response to movement of the pair of cables by the drive assembly in order to move the window relative to the carrier panel.

3 Claims, 9 Drawing Sheets

UNIVERSAL CABLE WINDOW REGULATOR ASSEMBLY FOR VEHICLES

FIELD OF THE INVENTION

This invention relates generally to the manually or power actuated windows and more specifically to window regulators for such windows.

BACKGROUND OF THE INVENTION

FIGS. 1 and 2 are respectively a front elevation and a perspective view of a typical conventional cable window lift system generally indicated by reference numeral 20. The system 20 includes a window regulator rail 22 along which runs a lift plate 24 which in turn is attached to a window glass (not shown). A top pulley 26 and a bottom pulley 28 are mounted to opposite ends of the rail 22. A cable 30 is attached to the lift plate 24 and extends over the top and bottom pulleys, 26 and 28 respectively. The cable 30 is operably connected to a window regulator motor 32 which causes the cable 30 to move longitudinally and in turn causes the lift plate 24 and any window attached thereto to move along the rail 22.

The conventional cable window lift systems 20 tend to be vehicle specific. As the window glass moves with the lift plate 24, and as window glass in automobiles is typically curved, the rail 22 must have a curvature corresponding to the glass and this will vary from vehicle to vehicle and from window to window within a given vehicle. Furthermore the rail must have a length consistent with the window travel which will vary from model to model, for example, a two door model versus a four door model.

Overall length of the rail 22 and top and bottom pulleys, 26 and 28 respectively, is also a concern as the vertical height available within, for example a door, is limited by the available space. The conventional cable window lift systems 20 have an overall height of approximately that of the travelled portion of the rail 22 plus the height of the top pulley 26 and that of the bottom pulley 28. The placement of the top pulley 26 and bottom pulley 28 on the rail 22, and typically in a plane parallel to the lift plate travel direction limits the travel of the lift plate 24 to the distance between the pulleys. Any attempt at further travel will result in the lift plate 24 striking either the top or bottom pulley 26 and 28 respectively.

SUMMARY OF THE INVENTION

The disadvantages of the prior art may be overcome by providing a cable window regulator, which is not vehicle specific.

It is further desirable to provide a cable window regulator, which does not require a rail.

It is yet further desirable to provide a cable window regulator in which a lift plate is moveable over a distance greater than the span between two pulleys.

According to one aspect of the invention, a cable window regulator is provided which has a first pulley rotatably mounted to a first pulley bracket for rotation about a first pulley axis and a second pulley rotatably mounted to a second pulley bracket for rotation about a second pulley axis. A lift plate is securable to a window glass constrained to travel in a window plane. Cables are affixed at opposite and distal ends of the lift plate and trained about the first and second pulleys. A drive assembly (e.g. motor, crank, etc.) is operably connected to the cables for causing movement of the cable and in turn moving lift plate relative to the first and second pulleys. The first pulley axis and the second pulley axis extending parallel to and spaced from the window plane.

The first and second pulley brackets may be mountable to the structure with the first and second pulley axis parallel to a plane of travel of the window.

The first and second pulley brackets may be mountable to the structure to position the first and second pulleys out of a path of movement of the window to avoid interference between the lift plate and the pulleys.

According to another aspect of the invention, the cable window regulator of the present invention is incorporated into a carrier panel of a door module.

According to another aspect of the invention, there is provided a cable window regulator assembly having at least four cable guiding elements, each rotatably mounted to a respective bracket that are spaced relative to each other in a generally rectangular configuration. A lift plate assembly is securable to a closure panel that is constrained to travel in a closure plane. A pair of first cables is affixed to opposite sides of the lift plate at opposite edges thereof. The cables are trained about a first pair of cable guiding elements to operatively engage a regulator drive assembly, whereby driven rotation of the drive assembly in opposite senses effects reciprocating travel of the lift plate. The first pair of cables extends between the drive assembly and the first pair of cable guiding elements along a first cable path. A second cable is affixed to the lift plate at opposite sides thereof and is trained about a second pair of said cable guiding elements to maintain coordinated travel of the lift plate. The second cable extends between the second pair of cable guiding elements along a second cable path. The first cable path crosses the second cable path. The at least four cable guiding elements has an axis of curvature that extends parallel to and is spaced from the closure plane.

According to another aspect of the invention, a cable window regulator assembly is provided which has a carrier panel securable to a door. First and second pulleys are rotatably mounted to the carrier panel. A lift plate is securable to a window glass and the window glass is constrained to travel along a predefined path. The lift plate is not directly attached to the carrier panel. A pair of cables is trained respectively around the first and second pulleys and is fixed to the lift plate. A drive assembly is operably coupled to the first and second cables for moving the pair of cables. The lift plate moves to and fro in response to movement of the pair of cables by the drive assembly in order to move the window glass relative to the carrier panel.

DESCRIPTION OF DRAWINGS

Preferred embodiments of the present invention are described in detail below with reference to the accompanying illustrations in which.

DESCRIPTION OF PREFERRED EMBODIMENTS

Figure 1:
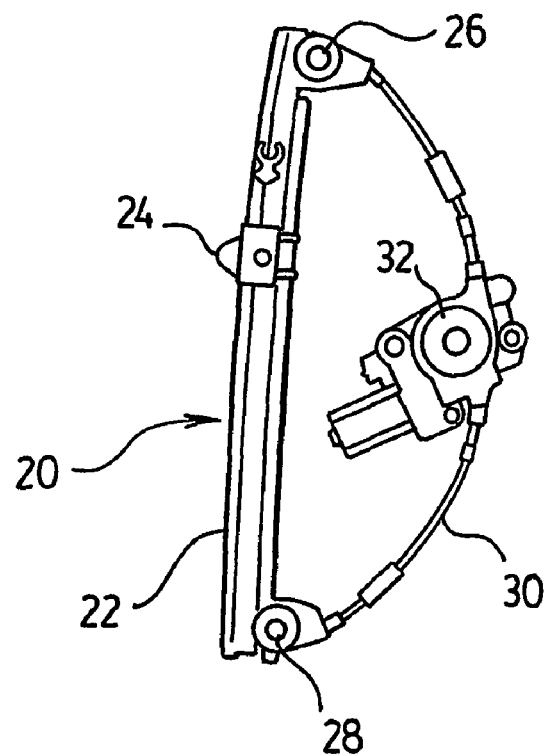
FIG. 1 is a front elevation of a prior art cable window lift system.
Figure 2:
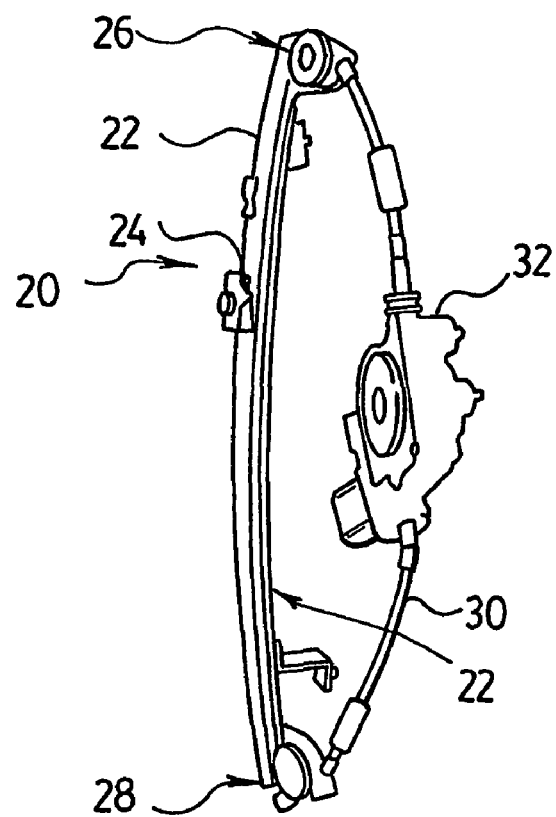
FIG. 2 is a perspective view of the prior art cable window regulator of FIG. 1.

A cable window regulator assembly according to the present invention is generally depicted by reference numeral 40 in FIGS. 3 through 10. The assembly 40 has a first pulley 42 rotatably mounted in a first pulley bracket 44 for rotation about a first pulley axis 46. The assembly 40 further has a second pulley 52 rotatably mounted in a second pulley bracket 54 for rotation about a second pulley axis 56. The First 42 and second 52 pulleys are spaced apart from one another and define a distance therebetween.

Figure 5:
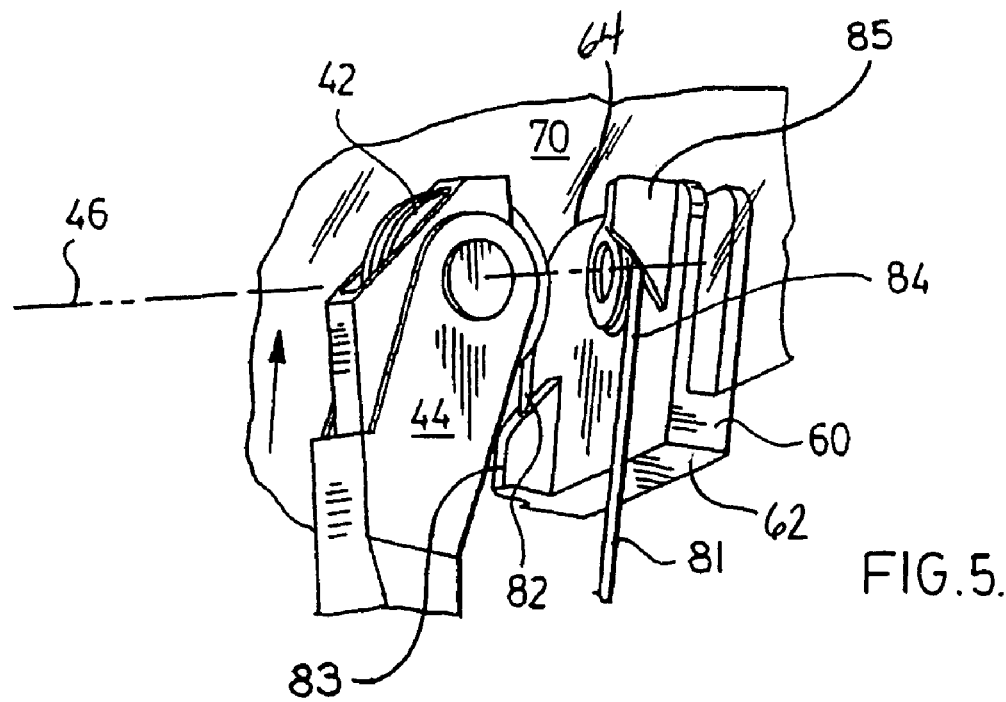
FIG. 5 is a perspective view illustrating a first end of a cable window regulator in a "glass up" configuration.
Figure 6:
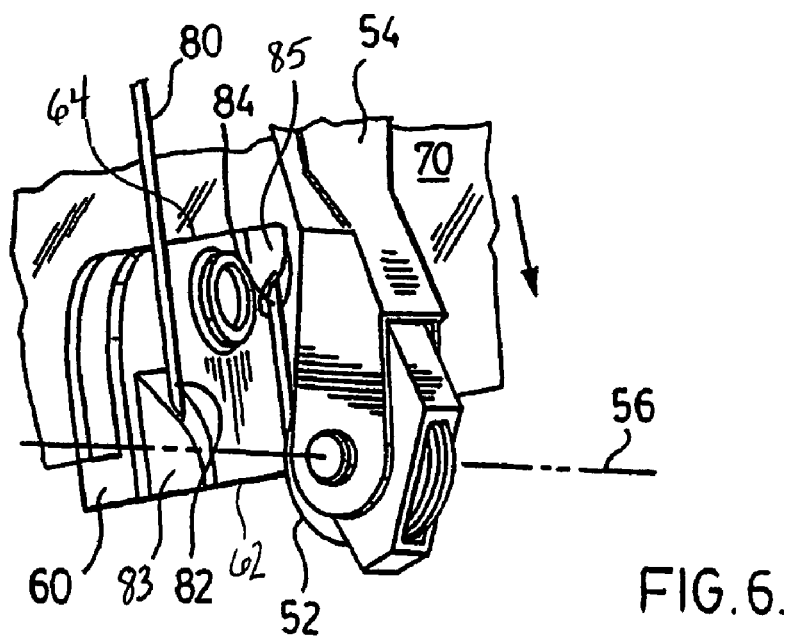
FIG. 6 is a perspective view illustrating a second end of a cable window regulator according to the present invention in a "glass down" configuration.
Figure 7:
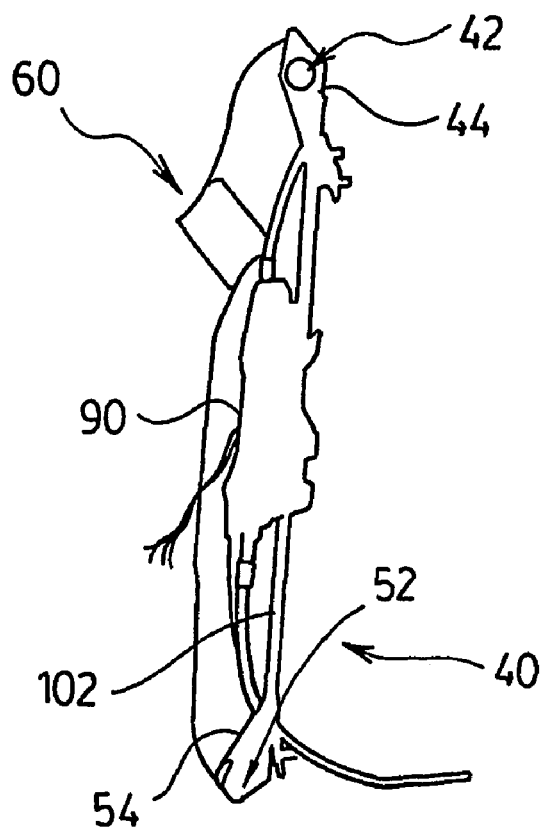
FIG. 7 is an end elevation illustrating a cable window regulator according to the present invention.
Figure 8:
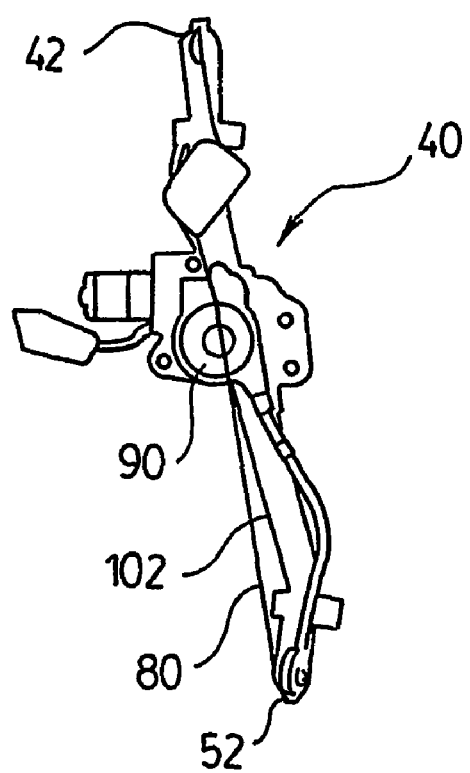
FIG. 8 is a front elevation illustrating a cable window regulator according to the present invention.
Figure 9:
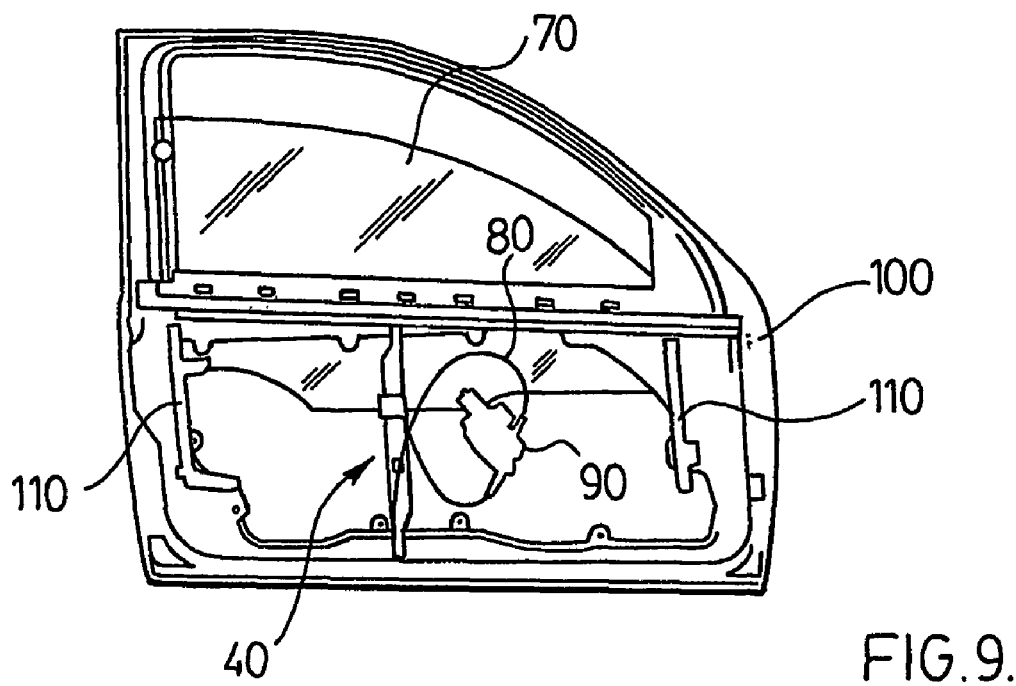
FIG. 9 is a front elevation illustrating a cable window regulator according to the present invention having one pair of first and second pulleys mounted to a door.

A lift plate 60 is provided which is securable to a closure panel or window glass 70 and affixed to cables 80 and 81 for movement longitudinally therewith. Cables 80, 81 are trained about and guided by the first pulley 42 and second pulley 52, respectively. As shown in FIGS. 5 and 6, the window regulating cable 80 has end 82 secured to a lower part 62 of the lift plate 60 at tabs 83 and cable 81 has end 84 secured to an upper part 64 of the lift plate 60 at tabs 85. Such a mounting arrangement wherein the cables 80, 81 attached to the horizontally and vertically distal ends of the lift plate 60 increases the distance that the lift plate 60 can travel before tabs 83 engage the first pulley 42 (or the first pulley bracket 44) or tabs 85 engage the second pulley 52 (or the second pulley bracket 54). In this manner, the distance of window travel is not limited to the distance between the first pulley 42 and the second pulley 52 as the lift plate 60 moves a distance greater than the distance between the first pulley 42 and the second pulley 52. Accordingly, brackets 44 and 54 may be mounted to a door panel structure 100 away from the upper and lower edges where the door is thinner and space is at a premium.

A regulator drive assembly 90 is operably connected to the cable for causing movement of the cables 80, 81 to in turn move the lift plate 60 and thereby move the window glass 70. The drive assembly 90 can either be a power motor or actuator assembly or a manual crank assembly. Typically an outer sheath will be provided over the cable between the drive assembly 90 and the first and second pulley brackets 42 and 52 respectively to prevent relative movement therebetween.

Unlike prior art configurations, the drive assembly 90 and as well the first pulley bracket 42 and second pulley bracket 52 are separately mountable to a structure such as a door 100 housing the window glass or panel 70. The window glass 70 may be mounted in guide rails 110 shown in FIGS. 9 and 10 to guide its movement to a closure or window plane.

Figure 3:
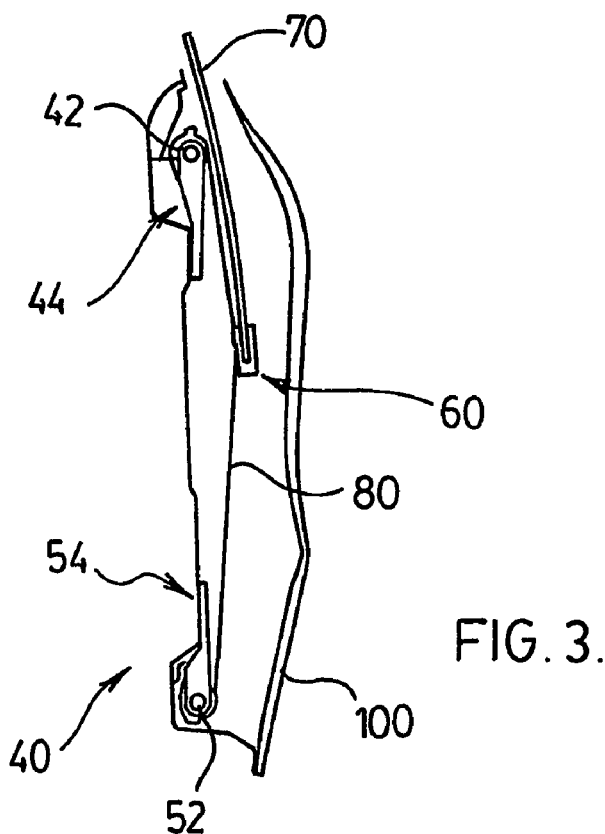
FIG. 3 is a schematic illustration of the mounting of one embodiment a cable window regulator according to the present invention.
Figure 4:
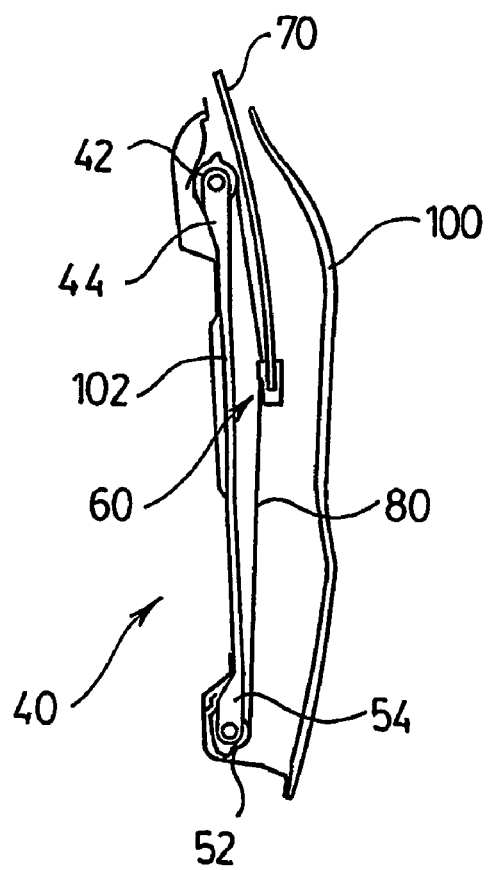
FIG. 4 is a schematic illustration corresponding to FIG. 3 showing an alternate mounting arrangement.

FIG. 3 illustrates mounting the first pulley bracket 44 and the second pulley bracket 54 directly to the door panel structure 100. Such a mounting would require that adequate structural integrity be provided by the door panel structure 100 and may be inconvenient during the assembly. The remaining Figures illustrate an intermediate bracket 102 extending between the first pulley bracket 44 and the second pulley bracket 54 to provide further support and accommodate the assembly. The intermediate bracket 102 may be integrated with the first pulley bracket 44 and the second pulley bracket 54.

According to the present invention movement of the lift plate 60 is caused by movement of the cables 80, 81 and guided by the window glass 70. The lift plate 60 does not run on a conventional rail. Guide rails 110 guide and constrain the window glass 70 to travel in a window plane.

As shown in FIGS. 5 and 6, the first pulley 42 and second pulley 52 may be offset from the window plane so as not to interfere with the lift plate 60. Furthermore, the first pulley 42 and second pulley 52 are rotatably mounted perpendicular to the window plane unlike the prior art arrangement wherein the top pulley 26, bottom pulley 24, rail 22 and lift plate 24 are generally parallel to the window plane. The first pulley axis 46 and the second pulley axis 56 are generally parallel to and spaced from each other and the window plane.

Figure 10:
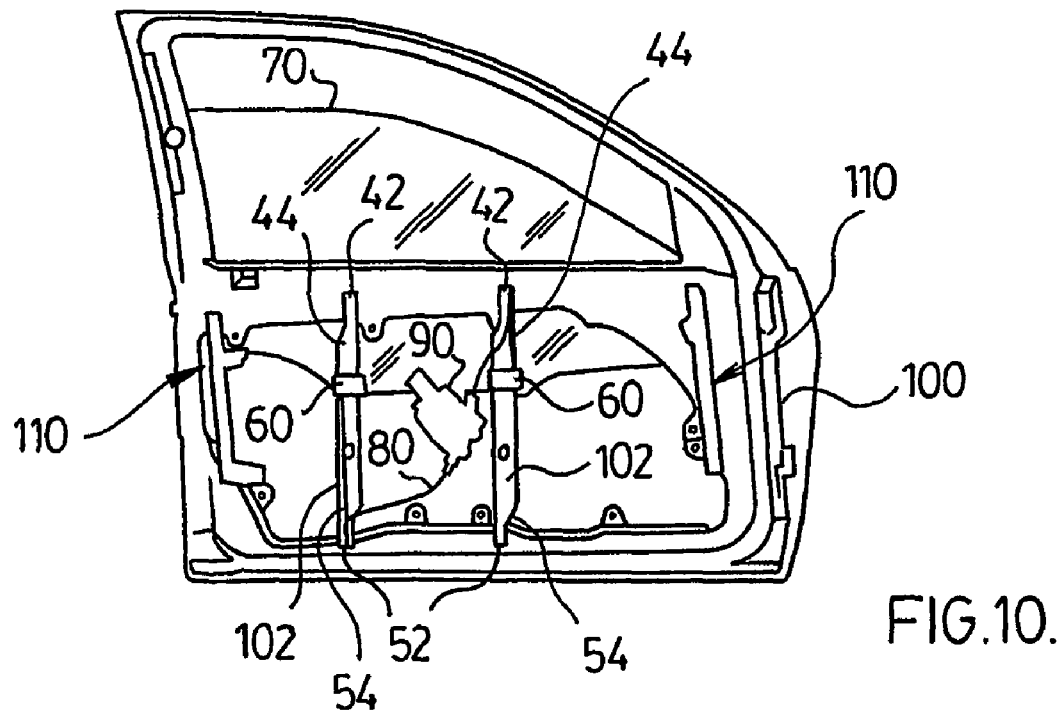
FIG. 10 is a front elevation illustrating a cable window regulator according to the present invention having two pairs of first and second pulleys mounted to a door.

In some instances, for example with larger window glass 70, it may be preferable to have more than one pair of first and second pulleys 42 and 52 respectively along with respective first and second pulley brackets 44 and 54 and lift plates 60. An arrangement where two pairs of the foregoing operated by cables 80, 81 interconnected by an intermediate cable (not shown) and window regulating motor 90 is shown in FIG. 10. The intermediate cable assists in maintaining coordinated travel of the glass 70 and prevents the glass 70 from twisting relative to the glass run channels and jamming therein.

It is now apparent to those skilled in the art that the first pulley 42 and the second pulley 52 could be replaced by arcuate non-rotating sliding surfaces. The arcuate sliding surfaces are commonly utilized in the window regulating industry to replace pulleys. Advantageously, the sliding surface could be molded directly to the mounting bracket. The arcuate sliding surface will have a center of curvature along the first and second pulley axi. Thus, the sliding surface is equivalent to a pulley and mount arrangement.

Figure 11:
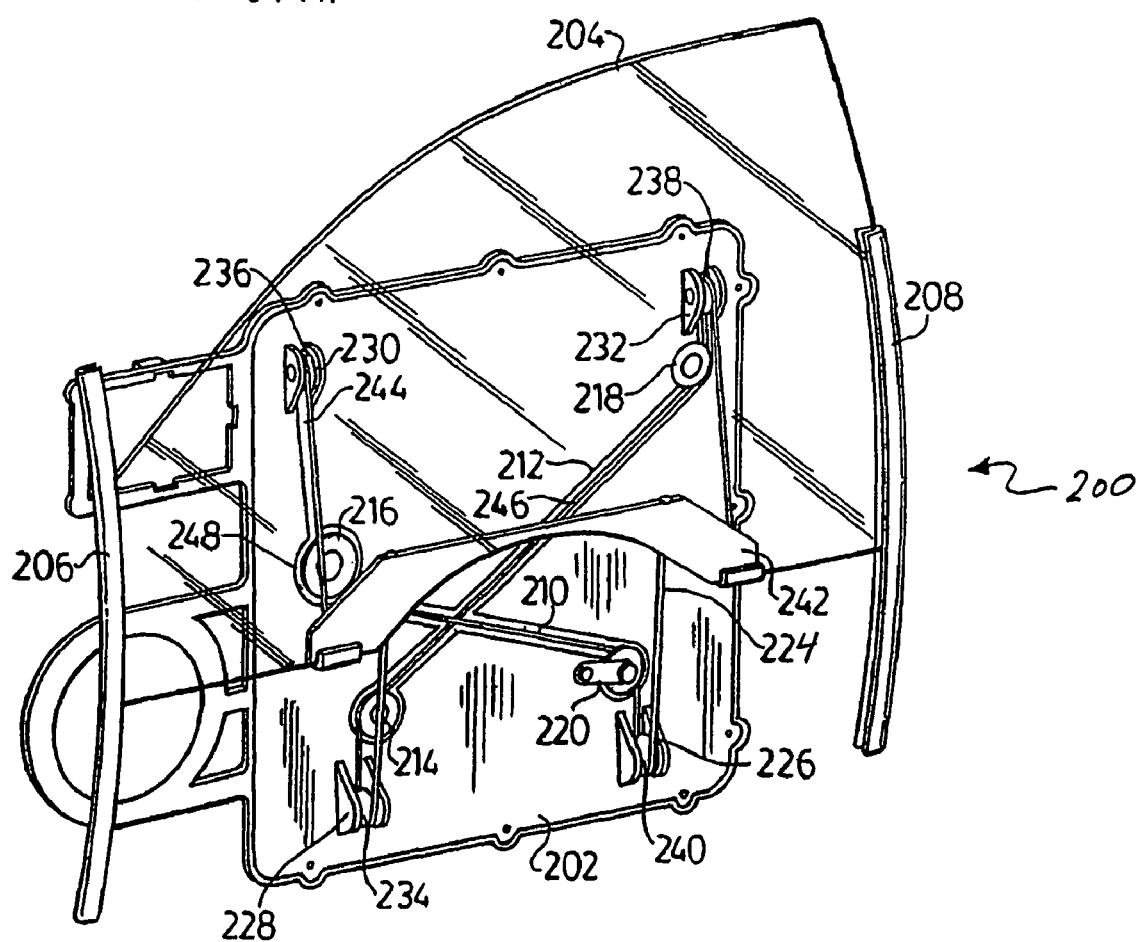
FIG. 11 is a side elevational view illustrating a door module incorporating a window regulator according to the present invention.
Figure 12:
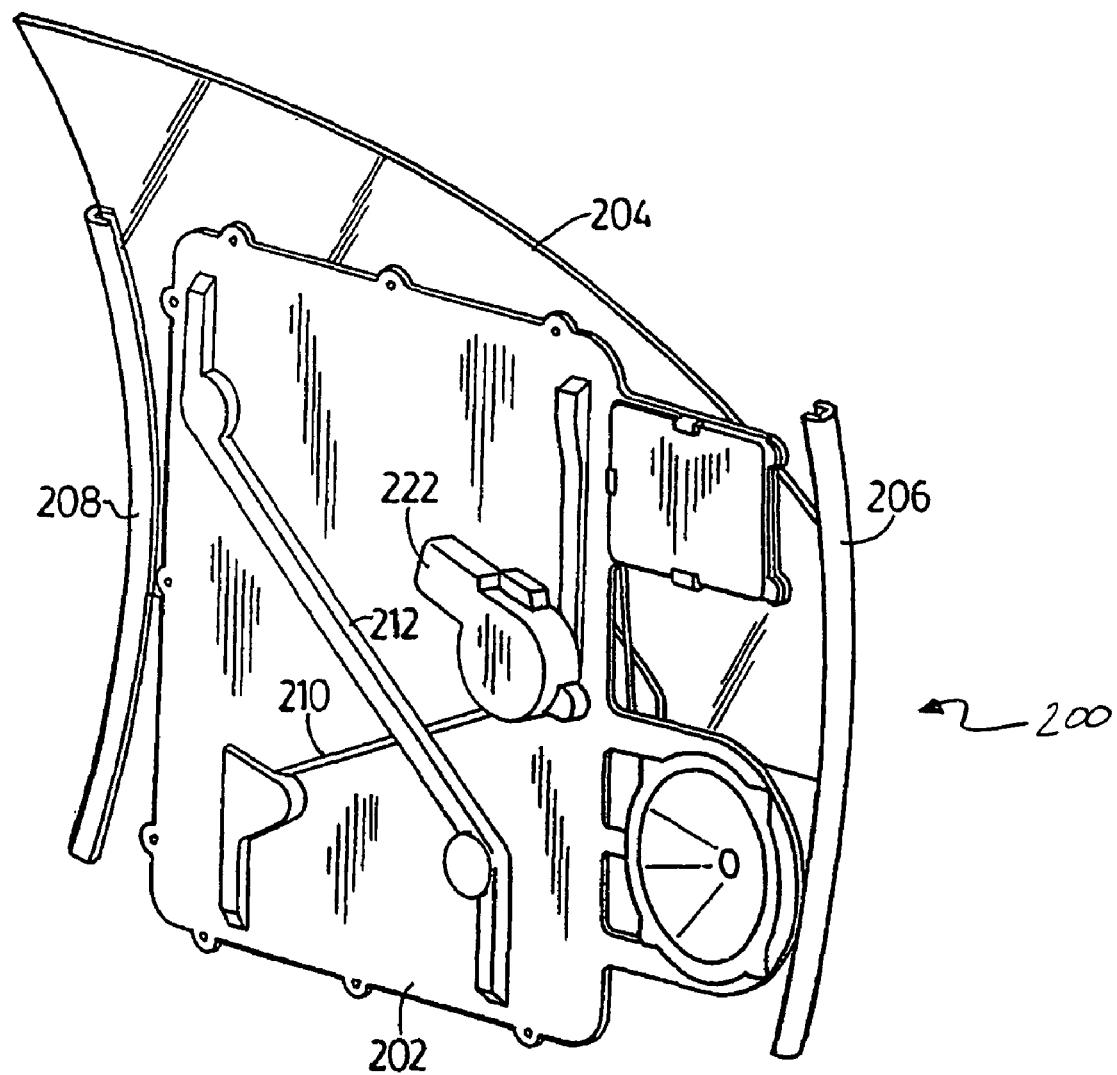
FIG. 12 is a reverse elevational view of the embodiment of FIG. 11.

Referring to FIGS. 11 and 12, the window regulator of the present invention is incorporated into a door module. As is well known in the art, the door module may carry a variety of the door components and may be based on the sealed hardware carrier, non-sealed hardware carrier, trim panel, etc. For clarity and illustration purposes, the shown door module 200 comprises a carrier panel 202, a window panel 204 and a pair of glass run channels 206 and 208. The window panel 204 is slidable in the glass run channels 206, 208. Glass run channels are optionally connected to the carrier panel 202 or affixed to the door frame (not illustrated).

The carrier panel 202 is preferably molded from an organic plastic material. The carrier panel 202 has integrally molded recess 248 for housing cable drum 216 and has a series of grooves 210 and 212 that intersect in a crossing pattern. The grooves 210 and 212 define cable paths. Alternatively, the cable paths can extend above the surface of the carrier panel 202. Cable guiding elements, namely pulleys 214, 218 and 220, are rotatably mounted at locations of the paths 210, 212 at turning points where the paths 210, 212 change direction. The cable drum 216 is drivingly mounted on a drive assembly 222 mounted on the reverse side of the carrier panel 202. In the example illustrated, the cable drum 216 is located to serve also as one of the cable guiding elements. At least one of the pulleys is mounted on a movable pivot that is biased to apply a tensioning force to a cable 224. In the example illustrated, pulley 220 is mounted in such a fashion, and the cable 224 is connected to the lift plate 242 by a tensioning device.

Carrier panel 202 is further provided with mounts 226, 228, 230 and 232, spaced therabout in a generally rectangular configuration. Each of the mounts 226, 228, 230 and 232 generally comprise a series of flanges that extend perpendicularly to the face of the panel 202. Preferably, mounts 226, 228, 230 and 232 are integrally molded onto the surface of the carrier panel 202. However, it is possible to attach or affix the mounts 226, 228, 230 and 232 to the panel utilizing conventional bonding or fastening techniques.

Pulleys 234, 236, 238 and 240 are pivotally mounted on the mounts 226, 228, 230 and 232. Pulleys 236, 238 rotate about a first and second upper pulley axi, which are parallel to each other. Pulleys 234, 240 rotate about a third and fourth lower pulley axi, which are parallel to each other. Upper and lower axi are also parallel to each other. The upper and lower axi also extend generally transverse to the direction of travel of the closure panel 204.

Cable 224 extends from the drum 216 downwardly along the path 210, about tensioning pulley 220, about pulley 240 and upwardly to an upper edge of the right side of lift plate 242. Cable 244 extends from the drum 216 upwardly, about pulley 236 and downwardly to the bottom edge of the left side of lift plate 242. Cable 246 extends from the lower edge of the right side of lift plate 242 upwardly about pulley 238 downwardly about pulley 218 in groove 212, about pulley 214 and pulley 234 and upwardly to the upper edge of the left side of lift plate 242.

Lift plate 242 has been illustrated as a single element extending from pulley 236 to pulley 238. However, it is apparent to those skilled in the art that lift plate 242 could be two separate elements. Also it is apparent to those skilled in the art, that the arrangement and number of the cable guiding elements, location of the cable drum, location and number of cable tensioning devices can vary without departing from the scope of the present invention.

Figure 13:
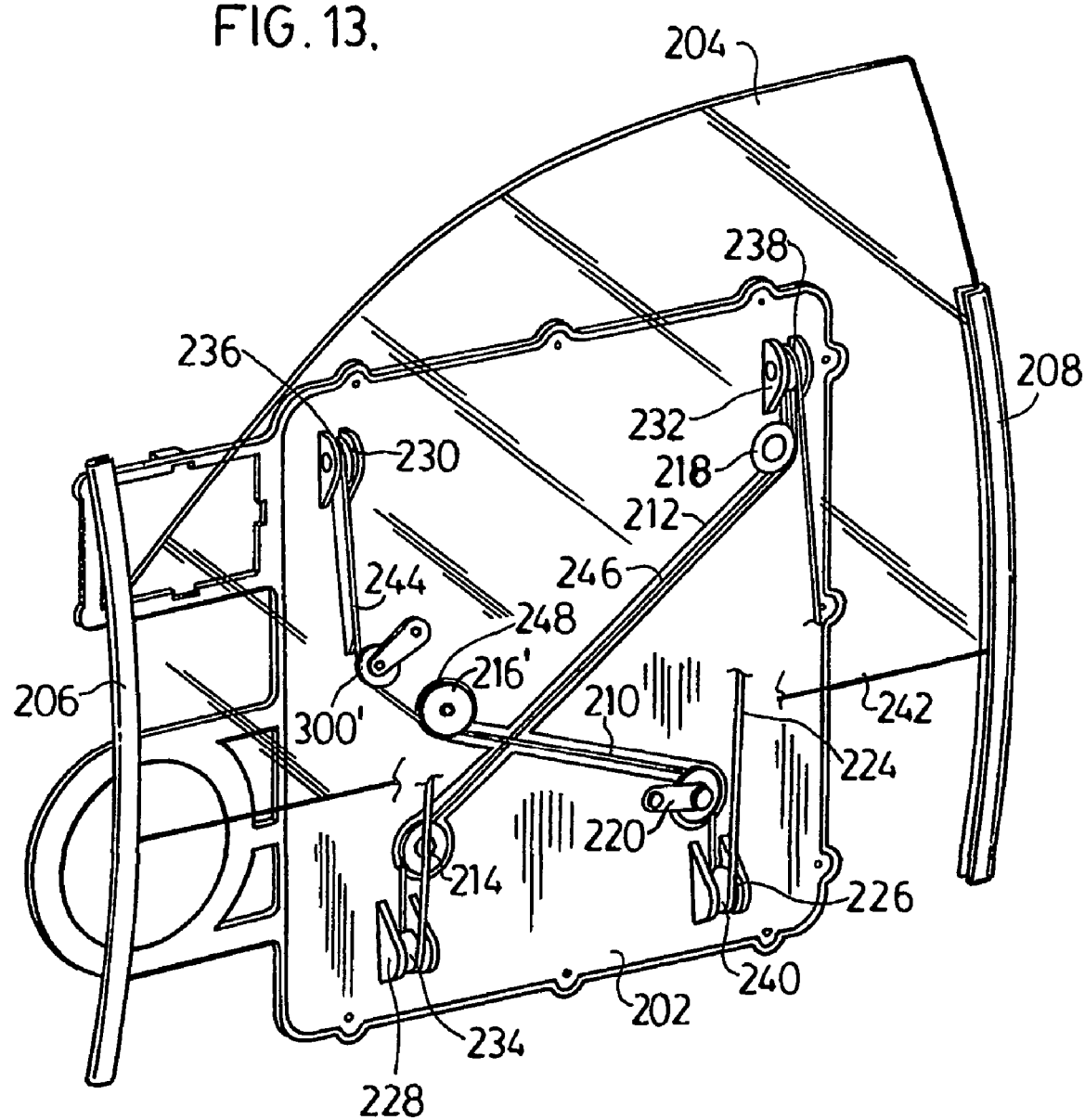
FIG. 13 is side elevational view illustrating a second embodiment of a door module incorporating a window regulator according to the present invention.
Figure 14:
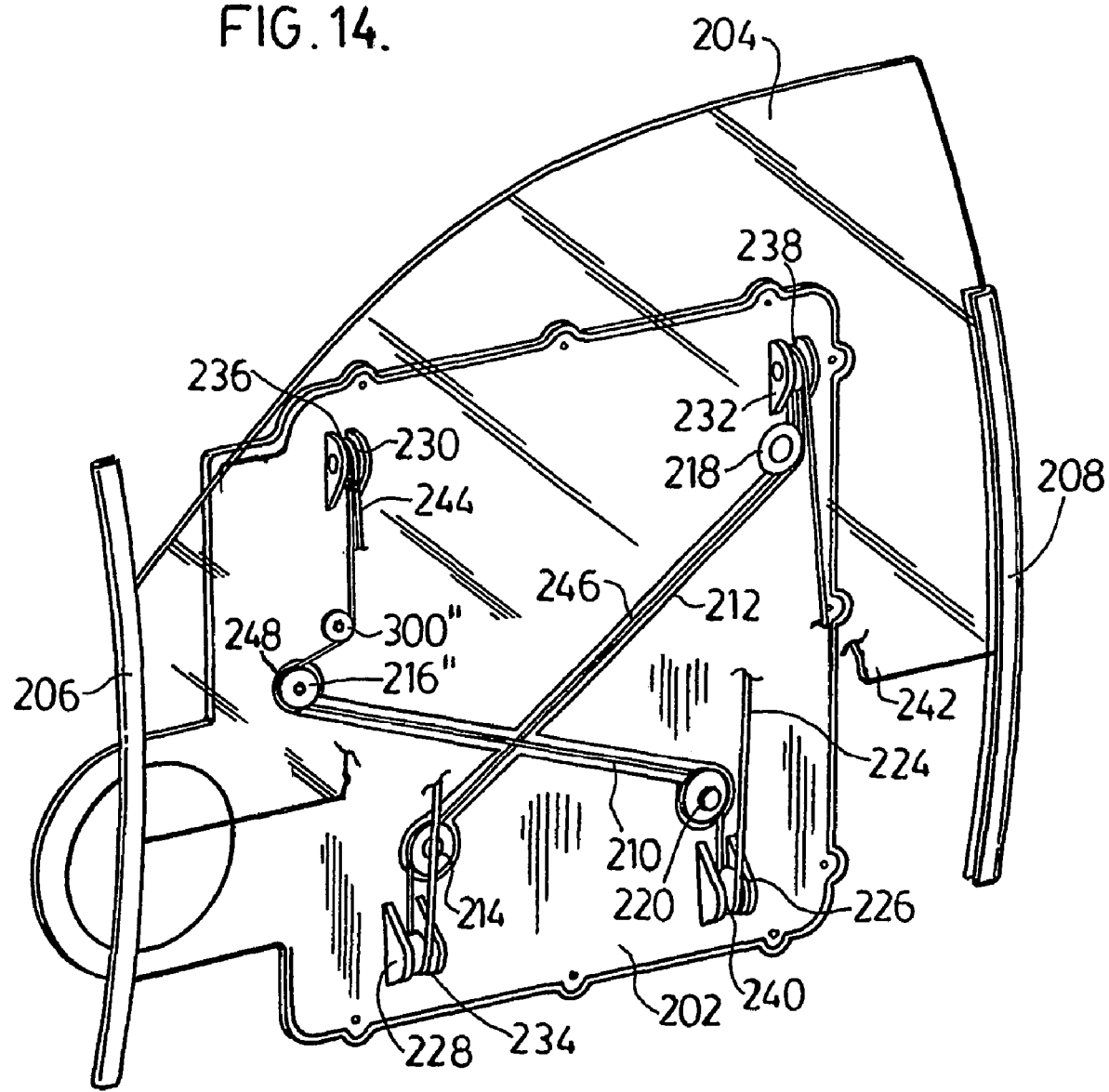
FIG. 14 is side elevational view illustrating a third embodiment of a door module incorporating a window regulator according to the present invention.

The examples of such variations are shown in FIGS. 13 and 14. In FIG. 13 the cable drum 216' is relocated towards the centre of the carrier panel 202. Additional cable guiding pulley 330' is located between the cable drum 216' and the pulley 236. The cable guided pulley 300' is mounted on a movable pivot that is biased to apply a tensioning force to the cable 244. In FIG. 14 the cable drum 216 " is relocated towards the edge of the carrier panel 202. Additional cable guiding pulley 300 " is located between the cable drum 216 " and the pulley 236. In this embodiment the pulley 220 is attached directly to the carrier panel 202. The cables 224 and 244 are tensioned by the devices positioned in other locations, e.g. in the liftplate 242.

Energizing the drive assembly 222 in opposite senses drives the window panel 204 between open and closed positions. Cable 246 operates to maintain the window panel 204 to move squarely relative glass run channels 206, 208.

As is apparent to those skilled in the art, the carrier panel 202 can be configured to support other components that are commonly found in vehicle doors, such as audio speakers, latches, switches, wire harnesses, etc. Additionally, the cable guiding elements along the cable paths 210, 212 could be replaced by non-rotating surfaces or slides to minimize costs.

The above description is intended in an illustrative rather than a restrictive sense. Variations may be apparent to those skilled in such structures without departing from the scope of the present invention which is defined by the claims set out below.

What is claimed is:

1. A cable window regulator assembly for a door of a motor vehicle, said cable window regulator assembly comprising:
   a plastic carrier panel securable to the door;
   a speaker mounted to said carrier panel;
   at least one glass run channel connected to said carrier panel;
   a window constrained to travel along a substantially predefined path by said at least one glass run channel;
   at least first and second cable guiding elements mounted to said carrier panel;
   at least first and second cable segments respectively trained around said at least first and second cable guiding elements;
   a lift plate solely secured to said first and second cable segments and solely securable to the window, wherein the window is constrained to travel along a substantially predefined path by said at least one glass run channel and said at least first and second cable guiding elements are spaced apart in the direction of travel of the window;
   at least one tensioning device engaged with at least one of said first and second cable segments and configured to apply a tensioning force thereto; and
   a drive assembly which includes a motor coupled to a cable drum, wherein said motor is mounted to said carrier panel and said cable drum is coupled to said at least first and second cable segments for moving said cable segments;
   said lift plate moving to and fro in response to movement of said cable segments by said drive assembly in order to move the window relative to said carrier panel along said substantially predefined path.

2. A cable window regulator assembly for a door of a motor vehicle, said cable window regulator assembly comprising:
   a plastic carrier panel securable to the door;
   a speaker mounted to said carrier panel;
   at least one glass run channel connected to said carrier panel;
   a window constrained to travel along a substantially predefined path by said at least one glass run channel:
   a first pulley rotatably mounted to said carrier panel;
   a second pulley rotatably mounted to said carrier panel;
   first and second cable segments respectively trained around said first and second pulleys;
   a lift plate solely secured to said first and second cable segments and securable solely to the window, wherein the window is constrained to travel along a substantially predefined path by said at least one glass run channel and said first and second pulleys are spaced apart in the direction of travel of the window;
   at least one tensioning device engaged with at least one of said first and second cable segments and configured to apply a tensioning force thereto; and
   a drive assembly which includes a motor coupled to a cable drum, wherein said motor is mounted to said carrier panel and said cable drum is coupled to said first and second cable segments for moving said cable segments;
   said lift plate moving to and fro in response to movement of said cable segments by said drive assembly in order to move the window relative to said carrier panel along said substantially predefined path.

3. A motor vehicle door, comprising:
   a plastic carrier panel secured to the door;
   a speaker mounted to said carrier panel;

at least one glass run channel connected to said carrier panel;

a window constrained to travel along a substantially predefined path by said at least one glass run channel;

first and second pulleys rotatably mounted to said carrier panel, said first and second pulleys spaced apart in the direction of travel of said window;

first and second cable segments respectively trained around said first and second pulleys;

a lift plate secured solely to said first and second cable segments and said window;

at least one tensioning device engaged with at least one of said first and second cable segments and configured to apply a tensioning force thereto; and a drive assembly which includes a motor coupled to a cable drum, wherein said motor is mounted to said carrier panel and said cable drum is coupled to said first and second cable segments for moving said cable segments;

said lift plate moving to and fro in response to movement of said cable segments by said drive assembly in order to move said window relative to said carrier panel and said path along said substantially predefined path.

* * * * *